Dec. 29, 1970   R. L. BEESLEY   3,551,033
QUICK CHANGE FILTER
Filed July 3, 1967
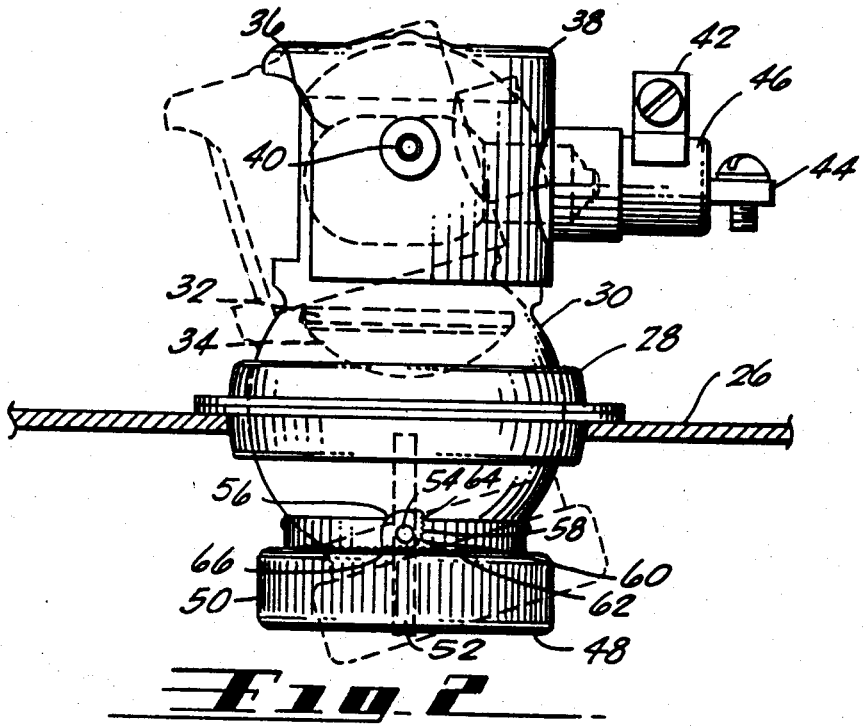
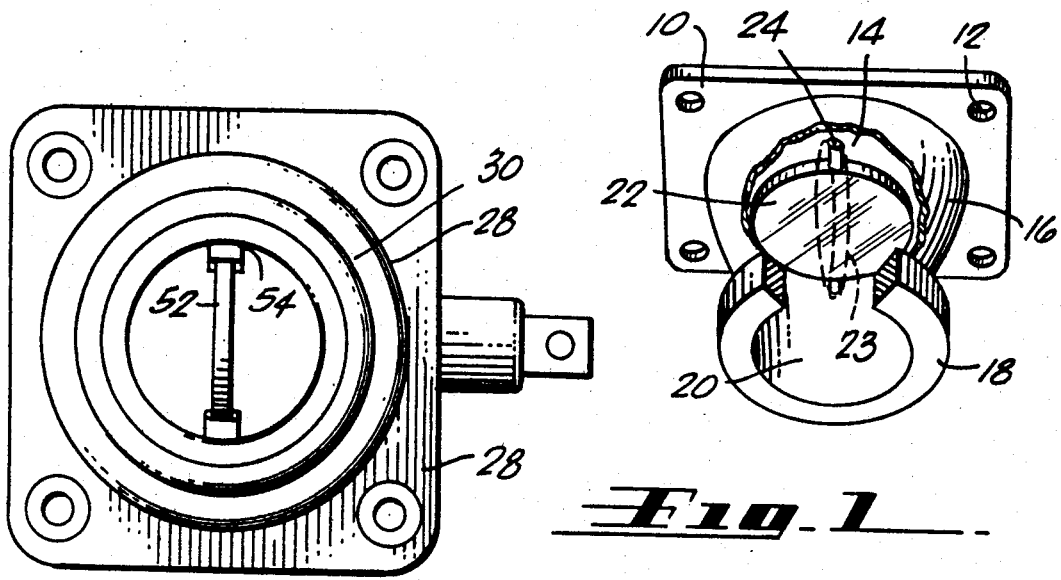
INVENTOR.
ROBERT L. BEESLEY
BY Robert O.
Richardson
-ATTORNEY-

United States Patent Office 3,551,033
Patented Dec. 29, 1970

3,551,033
QUICK CHANGE FILTER
Robert L. Beesley, Westminster, Calif., assignor to McDonnell Douglas Corporation, a corporation of Maryland
Filed July 3, 1967, Ser. No. 651,042
Int. Cl. G02b 5/22
U.S. Cl. 350—315    2 Claims

ABSTRACT OF THE DISCLOSURE

A pivotal light filter disc positioned at all times in the path of the light source and, when rotated to a plane normal to the light path, filters the light passing therethrough and, when rotated to a plane parallel to the light path, does not act as a filter nor does it cast a shadow on the object illuminated. Stop means limits the filter rotation between the two positions.

BACKGROUND OF THE INVENTION

The field of this invention is in illumination and, more specifically, in lighting of cockpits and passenger compartments of aircraft wherein the light intensity is varied with a filter.

The filtering of light for color effects or for varying the light intensity is often done by means of color wheels or multiple discs rotatable about an axis that extends in a direction parallel to the beam of light. This requires that the discs be moved into the light path from a convenient position in close proximity to the light path. However, these filtering discs, when in the stored position, cover an area approximately equal to that of the light path. On a crowded instrument panel in the cockpit of an aircraft, this requires a panel space twice the size of the light source to be used.

SUMMARY OF THE INVENTION

Specifically, a filter disc is rotatably mounted over the face of a light source in such a manner that the disc rotates about an axis passing through its diameter and normal to the light path. When the disc is rotated to cover the light source and is at right angles to the light path, it performs its filtering function. The filter is returned to its stored, or non-used position by a simple rotation of the disc to a plane parallel to the light path. Stop means limits the rotation of the disc between its two positions. In this manner, no more space is needed than that required by the existing light fixture to which it is attached. It needs no storage space when not in use, as is required by present filters. The disc does not cast a shadow on the object to be illuminated.

BRIEF DESCRIPTION OF THE DRAWINGS

FIG. 1 is a perspective view partly in-section of a filter adapted for attachment over a previously installed light source.

FIG. 2 shows an alternate form of a filter attached to a pivotal light, and

FIG. 3 is a front view of the alternate form showing the filter in non-use position.

DESCRIPTION OF THE PRESENT EMBODIMENTS

Referring now to FIG. 1, there is shown a mounting plate 10 having apertures 12 therein adapted to mount the plate on a wall, not shown, such as a cockpit instrument panel, for example. Mounting plate 10 has a large aperture 14 therein which may be positioned over a light source and to permit the passage of light therethrough. Extending outwardly over this aperture 14 is a filter housing 16 through which a light path may pass. This filter housing terminates in an annular ring 18 which may be of any suitable, decorative appearance. Pivotally mounted on the inner wall 20 of housing 16 is filter 22. This disc preferably is circular and has diametrically opposed ears 24 adapted to fit into suitable recesses within the walls 20 to provide an access about which the filter 22 may be rotated. In operation, the operator may easily rotate the disc 22 with his finger by pushing against the disc 22 when in the position shown in FIG. 1 in a direction along the light path. This, then, will move the filter to its non-use position, as shown by the dash lines 23. Similarly, the operator may press against the disc at right angles to the light path to move it back to its use position.

The above described filter and housing has particular use in an aircraft cockpit to vary the intensity of a light source such that it may serve as ambient illumination or may be used such as for map reading, for example. It may find other uses, such as, for example, a closet light, brief case light, or wherever it is desired that ambient light be changed to a reading light and vice versa, or a light of a different color be used. Suitable indicia may also be printed on the filter so that it may serve as a removable warning light.

FIG. 2 shows a modification wherein the rotatable light filter is used in a reading lamp for passengers on aircraft. Here is shown a suitable mounting wall 26 having a socket type mounting bracket 28 affixed thereto. Within this socket bracket is a ball-shaped housing 30 adapted to rotate up to 25° from its axis in all directions to permit adjustment of the light direction to suit the passengers' convenience.

Affixed within the housing in an appropriate manner is a conventional lens arrangement consisting of a factrolite lens 32 and convex lens 34 to provide a ten-foot-candle white light output at the center of the pattern and a one-foot candle minimum along the perimeter of a 12" circle at a distance of 24" from the lamp when using a 28-volt, 6-candle-power lamp 36 which is mounted therebehind in a lamp housing 38 affixed to the housing 30. Lock pins 40 releasably retain the lamp housing 38 on housing 30 to permit its removal for the replacement of lamp 36. Screw terminals 42, 44 affixed to lamp base 46 complete the assembly.

Affixed to the front of housing 30 is a bezel ring 48 having a serrated outer surface 50. Ring 48 is adapted to rotate 90° in order to rotate the filter 52 in a manner now to be described. Filter 52, preferably an orange plexiglass disc, is pivotally mounted across its diameter by pivot pins 54 mounted on housing 30. Affixed to pin 54 is a gear sector 56 having an arcuate edge 58 in contact with, and adapted to be rotated by, ring 48. Appropriate gear teeth 60 are shown on the gear sector and the ring for purposes of illustration, although it is to be understood that frictional contact of the abutting surfaces will cause gear sector 56 to rotate when ring 48 is manually turned by the operator.

The arcuate edge 58 has stop surfaces 64 and 66 which abut the inner surface of ring 48 to limit the degree of rotation of gear sector 56. In this manner when gear sector 56 has been moved 90° in a clockwise direction, it moves filter disc 52 from its non-use position as shown, to a plane normal to the light path, in which position it filters the light. A 90° counterclockwise rotation of gear sector 56 from this position returns the disc to its non-use position again.

Having thus described the present embodiments, many modifications and variations now will readily occur to those skilled in the art, and it is to be understood that these deviations are to be considered as part of the present invention.

I claim:
1. A quick change filter for a light path comprising:
a housing for said filter, said housing having an opening therein defining said light path,
a circular disc filter rotatably positioned within said opening and pivotal about an axis passing through the diameter of said filter, said filter remaining in said path during rotation thereof,
a ring rotatable around said opening,
an arcuate edged gear sector connected to said filter and in frictional contact with said ring whereby rotation of said ring causes rotation of said gear sector and filter,
said gear sector having stop surfaces which abut said ring to limit the degree of rotation of said gear sector between that position wherein said filter is parallel to said light path and that position wherein said filter is normal to said light path.

2. A quick change filter as set forth in claim 1 wherein said arcuate edge and said ring have cooperating gear teeth for rotating said gear sector upon rotation of said ring.

References Cited
UNITED STATES PATENTS

| | | | |
|---|---|---|---|
| 2,446,738 | 8/1948 | Briskin et al. | 88—1.5(NR)UX |
| 2,684,611 | 7/1954 | Hinden | 350—318UX |
| 2,685,640 | 8/1954 | Ross | 350—318X |

FOREIGN PATENTS

| | | | |
|---|---|---|---|
| 955,142 | 1949 | France | 350—318 |
| 813,746 | 1959 | Great Britain | 350—318 |

DAVID SCHONBERG, Primary Examiner

T. H. KUSMER, Assistant Examiner

U.S. Cl. X.R.

240—46.03, 46.59; 350—318